W. H. PENDLETON.
ANTISKIDDING DEVICE.
APPLICATION FILED MAR. 18, 1922.
1,417,560.
Patented May 30, 1922.
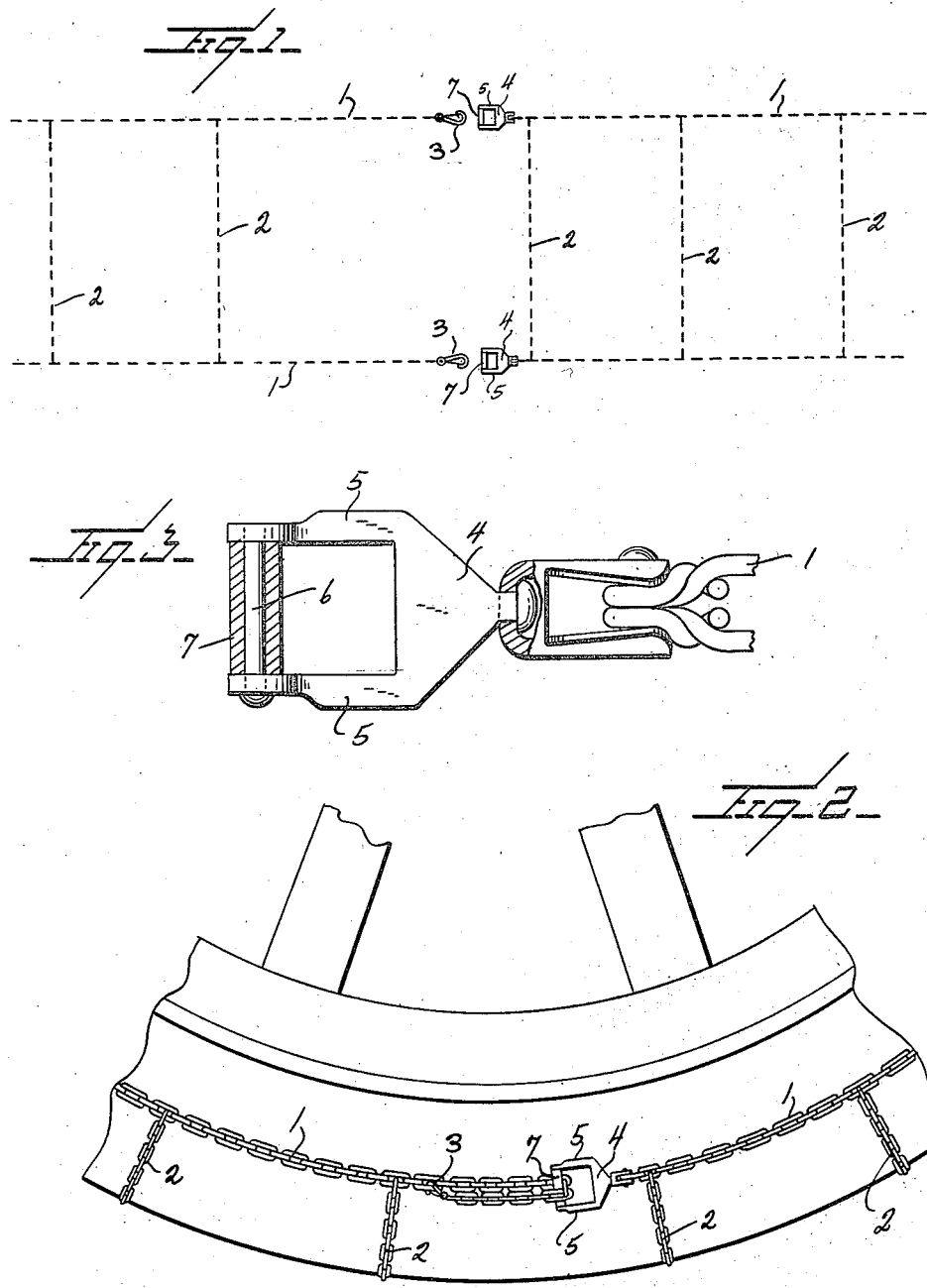
Inventor
W. H. Pendleton
By Watson E. Coleman
Attorney

UNITED STATES PATENT OFFICE.

WILLIAM H. PENDLETON, OF WASHINGTON, DISTRICT OF COLUMBIA.

ANTISKIDDING DEVICE.

1,417,560.  Specification of Letters Patent.  Patented May 30, 1922.

Application filed March 18, 1922. Serial No. 544,909.

*To all whom it may concern:*

Be it known that WILLIAM H. PENDLETON, a citizen of the United States, residing at Washington, in the District of Columbia, has invented certain new and useful Improvements in Antiskidding Devices, of which the following is a specification, reference being had to the accompanying drawings.

This invention relates to certain improvements in anti-skidding devices for use in connection with the wheels of automobiles or other vehicles, the same being a continuation, in part, of my prior application, Serial No. 498,271, filed September 3, 1921, and it is an object of the invention to provide a device of this general character having novel and improved means whereby the same may be readily and effectively applied in working position.

An additional object of the invention is to provide a device of this general character which is adapted to be disposed circumferentially of the wheel and wherein the extremities are provided with novel and improved means for locking the device in applied position, said means permitting the desired adjustment to facilitate the proper application of the device.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary diagrammatic view illustrating an anti-skidding device constructed in accordance with an embodiment of my invention;

Figure 2 is a fragmentary view in side elevation illustrating an anti-skidding device constructed in accordance with an embodiment of my invention and in applied position; and Figure 3 is an enlarged fragmentary view partly in elevation and partly in section of an eye member carried by an extremity of the side chain comprised in the completed device.

As disclosed in the accompanying drawings, 1 denotes side chains of any ordinary or preferred construction and which, when the device is applied, extend circumferentially around the wheel at opposite sides thereof in a well known manner. The side chains 1, at predetermined points, are connected by the cross chains 2 which, when the device is applied, overlie or extend across the tread of a wheel or more particularly the tire carried by said wheel.

An extremity of each of the side chains 1 has swivelled thereto a hook member 3 proferably of a snap type. Similar extremities of both of the chains 1 are provided with the hooks 3 and the end cross chain 2 adjacent said hooks 3 are positioned a material distance inwardly of said hook members 3 as is clearly indicated in Figure 1.

The end portion of each of the side chains 1 remote from the hook 3 has swivelled thereto a loop or eye member 4, said eye member having the arms 5 of a link and spaced apart a distance to permit the ready insertion therethrough of the securing member 3 at the opposite end of said side chains. The outer extremities of the side arms 5 are connected by a bar or pin 6 upon which is mounted a roller 7, said roller substantially bridging the space between said outer extremities of the arm 5.

After the device has been disposed circumferentially of the wheel or more particularly the tire thereof, the end portions of the side chains 1 provided with the hook members 3 are threaded through the eye or loop members 4 and said end portions of the side chains 1 are returned upon themselves and the hook members 3 engaged with the links of said side chains. By this means, the hook members 3 afford a medium whereby the device may be readily and conveniently adjusted with respect to the circumferential diameter of the wheel so that the fitting of the device to the wheel and the maintenance of the same in desired position is facilitated.

With the use of my improved device, it is not necessary to jack up or otherwise raise the wheel as the device can be applied to the wheel with the free extremities of the side chains 1 at the lower portion of the wheel. The outer side chain may be readily threaded through the outer hook or eye member 4 while the inner side chain, upon the operator reaching between the spokes of the wheel, may be readily and properly adjusted.

The provision of the eye or loop member 4 with the roller 7 materially facilitates the desired adjustment of the side chains 1.

The end cross chain or member 2 adjacent the loop or eye members 4 is arranged in relatively close proximity thereto so that, when the device is applied to a wheel, the opposite end cross chains or members will not be unduly spaced to impair the efficiency of the device.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An anti-skidding device comprising flexible side members, cross members connecting the same and adapted to extend over the tread of a wheel, a securing member carried by an end of each of the side members, an eye member carried by the opposite end portion of each of the side members, said eye member having side arms of a length and spaced apart a distance to permit the ready insertion through the eye member of the securing member at the opposite end of the side member through the eye member, and a roller carried by the outer portion of the eye member and interposed between the outer extremities of the side arms, the end cross member adjacent the securing members being positioned a material distance inwardly of the securing members, the end cross member adjacent the eye member being in close proximity thereto.

In testimony whereof I hereunto affix my signature.

WILLIAM H. PENDLETON.